Nov. 3, 1964 R. BULLOUGH ETAL 3,154,838
PRODUCTION OF P-N JUNCTIONS IN SEMI-CONDUCTOR MATERIAL
Filed March 18, 1960 4 Sheets-Sheet 1
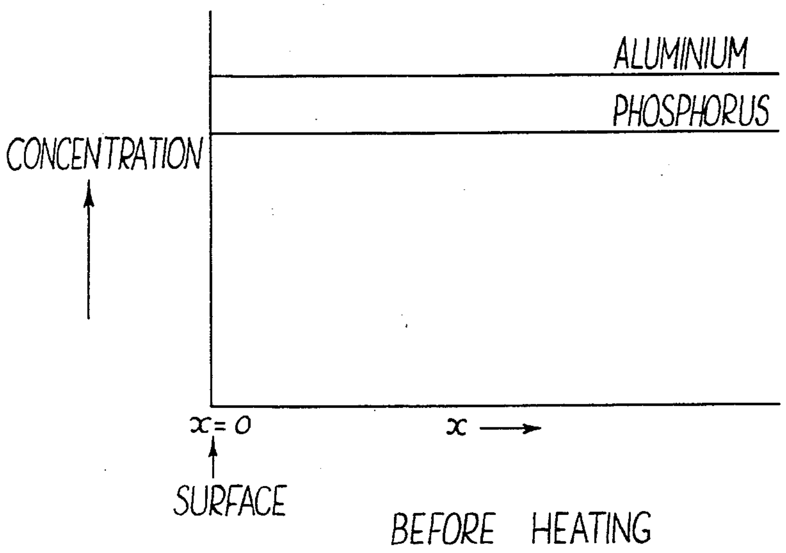
Fig. 1a
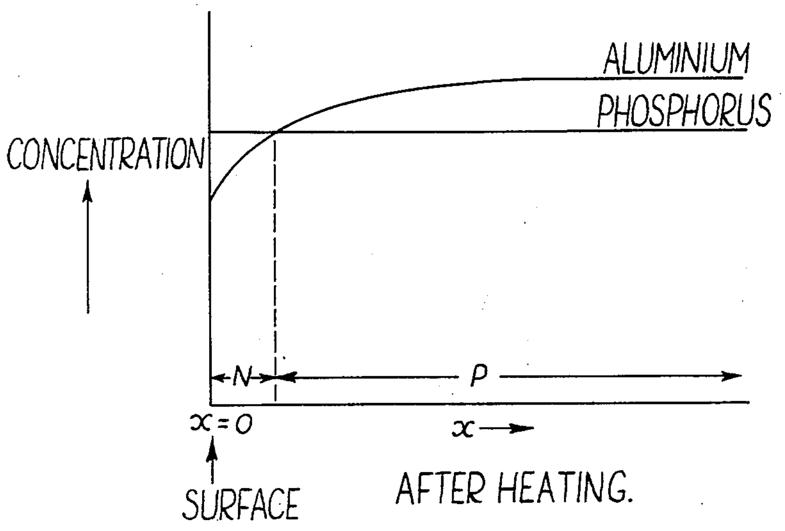
Fig. 1.b

PRODUCTION OF P-N JUNCTIONS IN SEMI-CONDUCTOR MATERIAL

Filed March 18, 1960 4 Sheets-Sheet 3

3,154,838
Patented Nov. 3, 1964

3,154,838

PRODUCTION OF P-N JUNCTIONS IN SEMI-CONDUCTOR MATERIAL

Ronald Bullough and Ronald Charles Newman, Earley, Reading, James Wakefield, Beenham, near Reading, Robert Lindsay Rouse, Caversham, Reading, and John Bernard Willis, Sulhamstead Hill, near Reading, England, assignors to Associated Electrical Industries Limited, London, England, a British company Filed Mar. 18, 1960, Ser. No. 15,934
Claims priority, application Great Britain Mar. 26, 1959
4 Claims. (Cl. 29—25.3)

Figure 2:
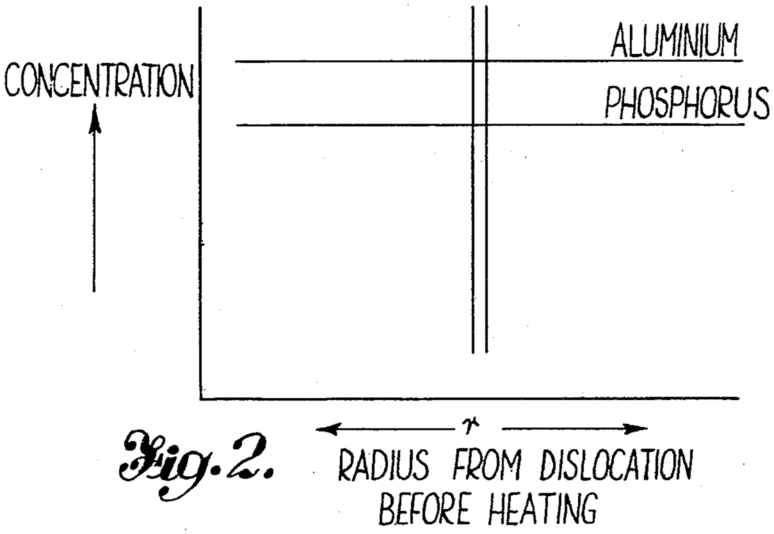

This invention relates to the production of P-N junctions in semi-conductor material and to the utilisation of such junctions.

P-N junction structures produced by the diffusion flow of impurities through the surface of a semi-conductor are well known. For example, if a slice of silicon of P-type conductivity is heated to a high temperature in the presence of an N-type activator impurity in the surrounding atmosphere, then a P-N junction is formed at a certain distance, depending on the temperature and time of heat treatment, from the surface. Alternatively, the N-type impurity acivator may be in the form of a thin deposit on the surface. In either case, the topology of the P-N junction corresponds exactly to that of the external surface.

It is known that mono-crystal semi-conductor material may contain, or may be made to contain, crystal defects. These crystal defects behave in some ways like internal surfaces in the crystal, particularly in the case of line defects called dislocations. These dislocations can be regarded as consisting of hollow cylindrical pipes of atomic dimensions running through the crystal.

According to the invention, P-N junction diodes utilising P-N junctions of small cross-sectional area are produced by heating a body of mono-crystal semi-conductor material containing impurity activators of both conductivity types present in suitable concentrations, as hereinafter defined, so as to produce controlled diffusion and precipitation in the region of crystal defects of one or more of the activators, whereby to cause one type of impurity activator in the region immediately surrounding a defect to be depleted or rendered inactive, and thereby to form an adjacent region of opposite conductivity type to that of the body, and attaching ohmic contacts to the region and to the body.

Suitable concentration of the donor and acceptor activator impurities are such that the impurity activator which precipitates or is rendered inactive at the dislocation is present initially in the higher concentration, and that the concentraton of both impurities is greater than a certain critical level, which corresponds to an internal surface concentration which is characteristic of the particular impurity and of the temperature to which the material is heated. This is described more fully hereinafter.

A process of producing a P-N junction in mono-crystal semi-conductor material, according to the invention, further consists in producing from a melt of material containing impurity activators of both conductivity types an ingot of mono-crystal material containing crystal dislocations, one of the impurity activators possessing a greater diffusion rate in the material than the other, cutting a wafer from the ingot, heating the wafer in such conditions as to cause a greater concentration of the impurity activator having the higher diffusion rate in the vicinity of the dislocation and thereby to form a P-N junction therearound, etching the wafer before or after the heating to locate the intersection of the dislocation with the surface of the wafer, and then affixing ohmic contacts to the wafer at opposite sides of the junction so provided.

Figure 3:
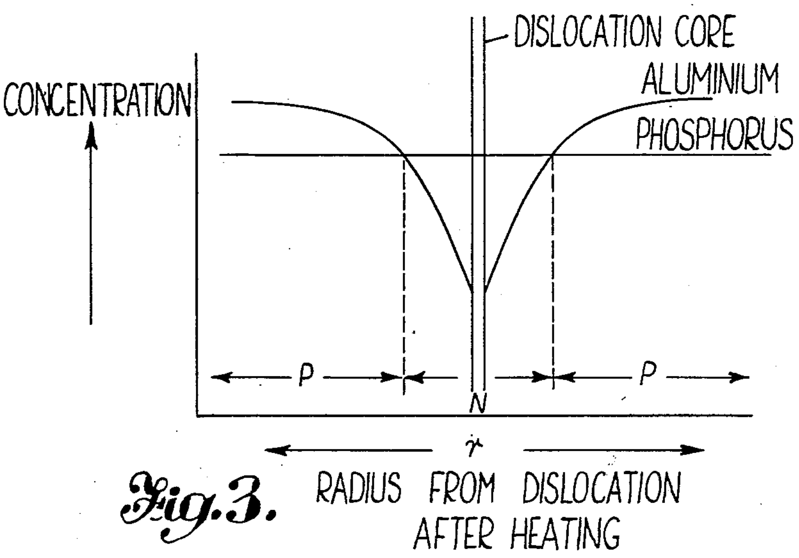
Figure 4A:
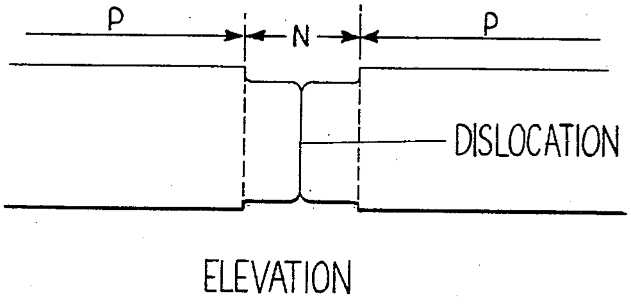
Figure 4B:
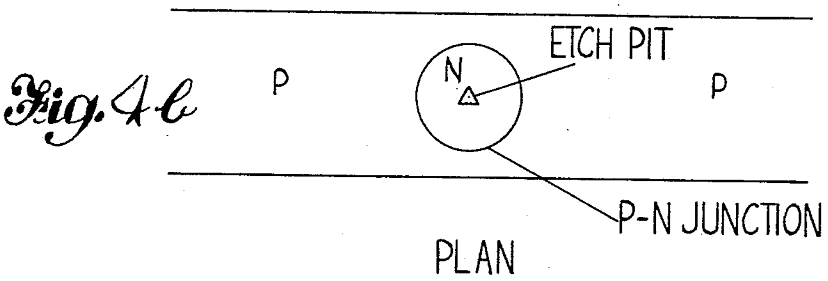
Figure 5A:
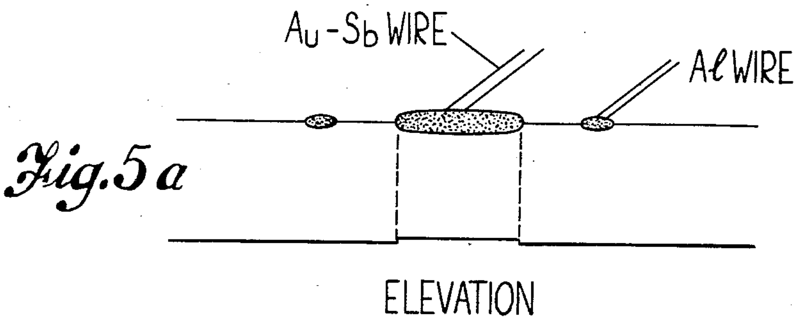
Figure 5B:
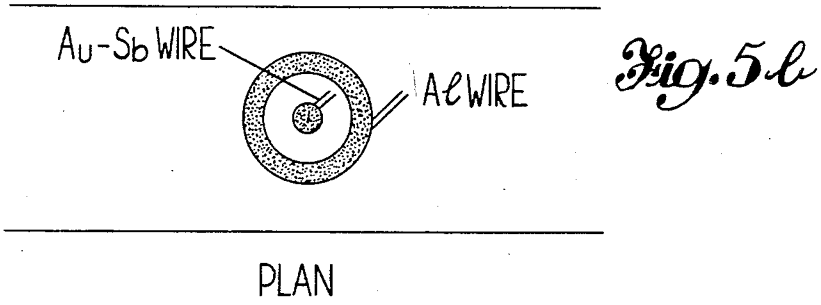
Figure 6A:
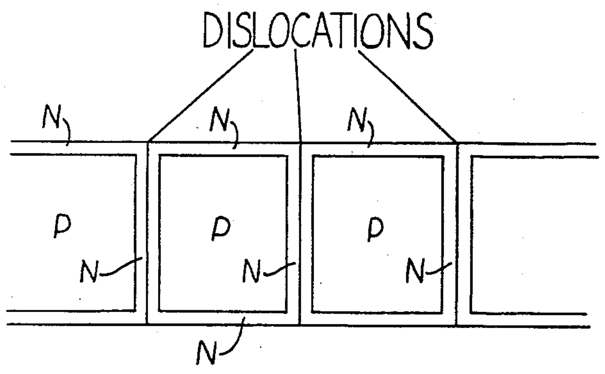
Figure 6B:
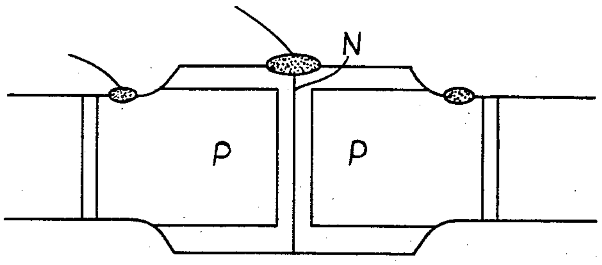

In the accompanying drawings, to which reference will be made in the following description of the manner in which the invention is carried into effect, FIGS. 1*a* and 1*b* represent diagrammatically the relative concentrations of selected impurity activators in a monocrystalline body before and after heating, respectively, FIG. 2 represents diagrammatically the relative concentrations of selected impurity activators in a mono-crystalline body containing a dislocation before heating, FIG. 3 is a representation, similar to FIG. 2, of the same body after heating, FIGS. 4*a* and 4*b* show in sectional elevation and plan, respectively, the presence of a dislocation in a wafer of mono-crystalline material after etching, FIGS. 5*a* and 5*b* show views, similar to those of FIGS. 4*a* and 4*b* of the same wafer with contacts attached, and FIGS. 6*a* and 6*b* show a cross-section of a wafer of mono-crystalline material containing dislocations before and after etching, respectively, FIG. 6*b* indicating in addition the contacts to the wafer.

The carrying out of the invention will now be described with particular reference to silicon as the semi-conductor, with aluminium as the P-type activator impurity and with phosphorus as the N-type activator impurity. Both the P-type and N-type impurities, used to form a junction, are introduced into the crystal in a substantially uniform concentration before the heat treatment takes place. This so-called "doping" of the crystal can be carried out during the crystal-growing process, i.e. when mono-crystalline semi-conductor material is being grown from the melt, by doping the melt with both aluminium and phosphorus. The aluminium is made to be present in the higher concentration so that the crystal is initially of P-type. For example, the aluminium may be present in a concentration approximately $10^{17}$ atoms per cc., and the phosphorus in a concentration about 25% less, the internal surface concentration being approximately $10^{16}$ atoms per cc., or a little higher, depending on the temperature. For diffusion of impurities to occur, the silicon is heated at a high temperature so as to allow the atoms to diffuse through the crystal lattice. This temperature which is somewhat below the melting point of the material may conveniently be in the range 1200–1250° C. Typically, the silicon bodies may be sealed into a quartz container which is evacuated or which contains an inert gas, the whole container then being heated in a resistance furnace.

To understand the process of the invention, the formation of P-N junctions at the external surface of a body of mono-crystal material by diffusion outwards may first be considered and we then, by analogy, describe the formation of P-N junctions at the dislocations. The aluminium which is at the surface of the silicon will, at the high temperature at which the heating is effected, combine with oxygen present in the atmosphere or in the silicon crystal itself, to form a stable aluminium-oxygen complex at the surface. The aluminium has a greater affinity for this complex than it has for the interior of the silicon crystal, so that the surface may be considered as forming a sink for aluminium. Aluminium thus flows from the internal regions of the crystal towards the surface, by diffusion. There is negligible diffusion flow of phosphorus towards the surface as the phosphorus concentration is not affected by the presence of oxygen. A planar P-N junction will thus form at a certain distance from the surface, where the aluminium concentration equals the phosphorus concentration, as shown in FIGS. 1*a* and 1*b*.

In the same way as described for the external surface, aluminium can combine with oxygen at dislocations to form a stable complex at the dislocation. The oxygen is already present in the crystal, if this is prepared in quartz crucible. Hence, there will be a preferential flow of aluminium, relative to phosphorus, to the dislocation. The aluminium which flows to the core of the dislocation is effectively taken from the surrounding region of the crystal, and once it reaches the core of the dislocation it ceases to act as an activator impurity. Thus, the aluminium concentration is reduced in the region surrounding the core of the dislocation, leaving the phosphorus in excess. Hence, there is an N-type region, bounded by a P-N junction formed coaxially round the dislocation; the P-N junction is thus of cylindrical shape for a tubular dislocation. The concentration distribution of impurities round the dislocation before and after heating is indicated in FIGS. 2 and 3.

The extent of the aluminium depletion shown in FIG. 3 depends primarily on the temperature and time of heat treatment, and hence the width of the P-N junction can be controlled by varying the temperature and time of heating. The width of the P-N junction also depends on the initial ratio of phosphorus to aluminium in the crystal, and this ratio can be readily controlled as part of the crystal-growing process.

The precipitation of aluminium in the manner described can be ensured by introducing a high concentration of oxygen into the crystal; this can conveniently be done during the crystal-growing process, e.g., by using a quartz crucible. The aluminium and oxygen form a stable complex at the dislocation core during the heating, whereas the phosphorus concentration is not affected by the presence of oxygen. Any other impurity which combines with aluminium to form a stable complex may also be used.

The P-N junction structure takes the form of a tubular core of N-type material of small cross-sectional area in a P-type matrix. The cross-sectional area of the N-type core can be readily controlled by adjustment of either (*a*) the temperature of heat treatment, (*b*) the time of heat treatment, and (*c*) the concentrations of aluminium and of phosphorus in the crystal.

In any mono-crystal body of silicon or other crystalline material, there will normally be a certain number of dislocations around which the P-N junctions will be formed as hereinbefore described. If the dislocation density is too high, the N-type regions round the individual dislocations will coalesce, while if it is too low only a few P-N junctions will be formed in a given size of crystal. Hence, in order to make efficient use of the process of the invention, it is necessary to effect a degree of control over the density of the dislocations during the crystal-growing process. This can be done by careful control over the conditions of crystal growth, in particular the seeding operation, crystal orientation, temperature distribution in the solid and liquid, growth rate and mechanical vibration. A convenient dislocation density is about 10 to 1000 dislocations/sq. cm.

A wafer of suitable thickness is cut from the grown crystal. The dislocations are located on the surface of this wafer by an etching procedure. A suitable etch for this purpose consists, for example, of a mixture of hydrofluoric acid, nitric acid, and acetic acid in the proportions 1HF, $3HNO_3$, $10CH_3COOH$. This etch leads to the formation of an etch pit where the dislocation intersects the surface.

After heat treatment, a thin surface layer is removed by grinding or other means. This removes the N-type surface skin which is formed on heat treatment, as hereinbefore described. The P-N junction profile can then be delineated on the surface of the crystal by etching, for example, in a mixture of 50% hydrofluoric acid, 50% nitric acid, or, alternatively, in the etch described above. In these etches, the N-type region of the crystal is removed at a faster rate than the P-type crystal, thus producing a step on the surface at the P-N junction, and also forming an etch pit at the point of emergence of the dislocation. The profile obtained for a single dislocation which traverses the specimen is shown in FIGS. 4*a* and 4*b*. The path of the dislocation inside the crystal can be followed by means of infra-red transmission microscopy, using infra-red radiation of wave-length greater than that corresponding to the absorption edge (i.e., a wavelength greater than $1.1 \times 10^{-4}$ cm.). The wafer can then be further cut into slices, if desired, to isolate particular dislocations or groups of dislocations.

When a particular P-N junction has been located, contacts are applied to the P- and N-regions by techniques which are well known in semi-conductor technology. For instance, a gold wire containing a small trace of antimony (an N-type material) may be alloyed to the N-type core and aluminium may be alloyed to the P-type material. This latter contact can be made in the form of a ring-contact surrounding the N-type core. Either an evaporated ring of aluminium or a ring of aluminium wire may be used for this purpose, as shown in FIGS. 5*a* and 5*b*. In this way a P-N junction diode is formed.

An alternative method of applying contacts to the P- and N-regions may be as follows. As hereinbefore described, an N-type skin is formed at the surface by the preferential out-diffusion of aluminium. In order to facilitate the making of low-resistance contacts to the surface skin, the conductivity of the surface layer can be increased by in-diffusing an additional N-type impurity. This can conveniently be done by carrying out the heat treatment in the presence of an N-type impurity external to the crystal. This type of structure is shown in FIG. 6*a*. Any particular dislocation can be located by infra-red transmission microscopy and its point of emergence at the surface may then be marked. The region round the particular N-type core to which contact is to be made is then protected by an acid-resisting wax, and the remainder of the surface is etched to expose the original P-type material, as shown in FIG. 6*b*. Contacts to the P- and N-materials can then be made in the usual way.

It is obvious that a multiplicity of such P-N junctions can be formed in the one sample containing a multiplicity of dislocations. An array of P-N junction diodes may thus be prepared in a suitable crystal. The method is also capable of extension to multiple junction structures round single dislocations using suitably doped crystals. It is also clear that by the use of crystals with a high density of dislocations the individual N-type regions will coalesce and form continuous N-type regions or layers in the mono-crystal. By the use of material with appropriate distributions of dislocations, junction diodes of larger area, or transistors, can be prepared.

What we claim is:

1. A process for producing a body of semiconductor material of substantially mono-crystalline structure having junctions therein of small cross-sectional area between regions of said material of opposite conductivity type consisting in producing said body containing defects, said defects being line edge dislocations, said body also containing homogeneously as solutes both oxygen together with at least one each of impurity activators characteristic of opposite conductivity type, the concentration of impurity activator characteristic of one conductivity type being initially predominant whereby to cause said body to display said one conductivity type, heating said body in controlled manner and at a selected temperature whereby to cause oxygen at each of said defects to combine with and render inactive at least part of said initially predominant impurity acivator thereat, and so cause consequent preferential diffusion of said initially predominant impurity activator from a region proximate to said defect thereunto, whereby to produce around each of said defects a region of opposite conductivity type to that of said body and produce thereby said junctions between said regions.

2. A process for producing a body of semiconductor material of substantially mono-crystalline structure having therein junctions of small cross-sectional area between regions of material of opposite conductivity type which consists of producing in controlled manner a body of semiconductor material containing defects in said structure, said defects being line edge dislocations, said body also containing homogeneously as solutes both oxygen together with at least one each of impurity activator characteristic of opposite conductivity type, the concentration of impurity activator characteristic of one conductivity type being initially predominant whereby to cause said body to display said one conductivity type, cutting a wafer from said body, etching said wafer whereby to disclose the intersection of each of said defects with the surface of said wafer, heating said wafer in controlled manner and at a selected temperature whereby to cause said oxygen at each of said defects to combine with and render inactive at least part of said initially predominant activator thereat, and so cause consequent preferential diffusion of said initially predominant activator from the region proximate to each defect thereto, whereby to produce around each of said defect regions of opposite conductivity type to that of said body and produce thereby said junctions and attaching ohmic contacts to the wafer at opposite sides of each junction so provided.

3. A process for producing a P-N junction in a body of substantially mono-crystal semiconductor material containing line edge dislocations which consists in producing said body from a melt of said material containing oxygen dissolved therein, together with impurity activators characteristic of both conductivity types, the activators of one type being initially predominant in homogeneous concentration in said ingot, cutting a wafer from said ingot, heating the wafer to a selected temperature to cause the concentration of impurity activator initially predominant in the vicinity of each dislocation to combine with the said oxygen and become depleted thereat and thereby form a P-N junction therearound, etching the wafer to locate the intersection of the dislocation with the surface of the wafer and affixing ohmic contacts to the wafer at opposite sides of the junctions so provided.

4. A process as claimed in claim 3 in which, when silicon is employed as the semiconductor and aluminium and phosphorus are used as the activator impurities, the aluminium is present in the melt from which the body is obtained in a concentration of about $10^{17}$ atoms per cc. and the phosphorus in a concentration of about $10^{13}$ atoms per cc., and the body is heated in the temperature range from 1200° to 1250° C.

References Cited in the file of this patent

UNITED STATES PATENTS

| | | |
|---|---|---|
| 2,954,307 | Shockley | Sept. 27, 1960 |
| 2,979,427 | Shockley | Apr. 11, 1961 |

OTHER REFERENCES

Ellis: Journal of Applied Physics, volume 26, No. 9, September 1955, relied on pages 1140–1146.

Journal of Applied Physics, volume 28, August 1957, relied on pages 882–887.

Journal of Applied Physics, volume 29, 1958, relied on pages 736 and 737.

Karstensen, Journal of Electronics & Control, volume 3, July–December 1957; relied on pages 305–307.

Bilby: Journal of the Physical Society of Japan, volume 10, No. 8, August 1955, relied on pages 673–679.